(12) United States Patent
Dandurand et al.

(10) Patent No.: US 10,870,456 B2
(45) Date of Patent: Dec. 22, 2020

(54) TRACK FOR TRACTION OF AN OFF-ROAD VEHICLE SUCH AS A SNOWMOBILE OR AN ALL-TERRAIN VEHICLE (ATV)

(71) Applicant: CAMOPLAST SOLIDEAL INC., Sherbrooke (CA)

(72) Inventors: Jules Dandurand, Sherbrooke (CA); Denis Courtemanche, Val Joli (CA); Jason Davis, Cadyville, NY (US)

(73) Assignee: CAMSO INC., Magog (CA)

( * ) Notice: Subject to any disclaimer, the term of this patent is extended or adjusted under 35 U.S.C. 154(b) by 700 days.

(21) Appl. No.: 15/118,559

(22) PCT Filed: Feb. 13, 2015

(86) PCT No.: PCT/CA2015/000087
§ 371 (c)(1),
(2) Date: Aug. 12, 2016

(87) PCT Pub. No.: WO2015/120544
PCT Pub. Date: Aug. 20, 2015

(65) Prior Publication Data
US 2017/0043821 A1     Feb. 16, 2017

Related U.S. Application Data

(60) Provisional application No. 61/939,483, filed on Feb. 13, 2014.

(51) Int. Cl.
*B62D 55/26* (2006.01)
*B62D 55/24* (2006.01)
*B62D 55/07* (2006.01)
*B62D 55/32* (2006.01)
(Continued)

(52) U.S. Cl.
CPC .......... *B62D 55/244* (2013.01); *B62D 55/07* (2013.01); *B62D 55/26* (2013.01); *B62D 55/32* (2013.01); *B62D 55/065* (2013.01); *B62M 27/02* (2013.01); *B62M 2027/027* (2013.01)

(58) Field of Classification Search
CPC ...... B62D 55/244; B62D 55/24; B62D 55/26; B62D 55/32; B62D 55/07
See application file for complete search history.

(56) References Cited

U.S. PATENT DOCUMENTS

| | | | |
|---|---|---|---|
| 6,203,125 B1 * | 3/2001 | Arakawa | B62D 55/24 305/166 |
| 6,575,540 B2 | 6/2003 | Soucy et al. | |
| 7,063,396 B2 | 6/2006 | Dandurand | |

(Continued)

FOREIGN PATENT DOCUMENTS

| | | | |
|---|---|---|---|
| CA | 2844350 | 8/2015 | |
| JP | 02114074 A | * 4/1990 | B62D 55/24 |
| WO | WO2015120544 | 8/2015 | |

OTHER PUBLICATIONS

International Search Report dated May 25, 2015 in connection with PCT Patent Application No. PCT/CA2015/000087, 4 pages.

*Primary Examiner* — Scott A Browne

(57) ABSTRACT

A track for traction of an off-road vehicle such as a snowmobile or an all-terrain vehicle (ATV). The track comprises an inner surface, a ground-engaging outer surface, and a plurality of traction projections projecting from the ground-engaging outer surface. The track may be very thin and/or the traction projections may be very high.

7 Claims, 12 Drawing Sheets

(51) Int. Cl.
*B62D 55/065* (2006.01)
*B62M 27/02* (2006.01)

(56) References Cited

U.S. PATENT DOCUMENTS

| | | | | |
|---|---|---|---|---|
| 7,806,487 | B2 | 10/2010 | Paradis et al. | |
| 7,823,987 | B2 | 11/2010 | Dandurand et al. | |
| 8,567,876 | B2 * | 10/2013 | Wellman | B62D 55/244 |
| | | | | 305/166 |
| 2011/0074210 | A1 * | 3/2011 | Paradis | B62D 55/096 |
| | | | | 305/165 |
| 2011/0101135 | A1 * | 5/2011 | Korus | B62D 55/04 |
| | | | | 239/723 |

\* cited by examiner

TRACK FOR TRACTION OF AN OFF-ROAD VEHICLE SUCH AS A SNOWMOBILE OR AN ALL-TERRAIN VEHICLE (ATV)

CROSS-REFERENCE TO RELATED APPLICATIONS

This application is a National Phase Entry of International PCT Application PCT/CA2015/000087 file on Feb. 13, 2015, designating the United States, and claiming priority from U.S. Provisional Patent Application 61/939,483 filed on Feb. 13, 2014 and incorporated herein by reference.

FIELD

The invention relates generally to off-road vehicles such as snowmobiles and all-terrain vehicles (ATV) and, more particularly, to tracks for traction of snowmobiles, ATVs and other off-road vehicles.

BACKGROUND

Snowmobiles allow efficient travel on snowy and in some cases icy grounds. A snowmobile comprises a track system which engages the ground to provide traction. The track system comprises a track-engaging assembly and a track that moves around the track-engaging assembly and engages the ground to generate traction. The track typically comprises an elastomeric body in which are embedded certain reinforcements, such as transversal stiffening rods providing transversal rigidity to the track, longitudinal cables providing tensional strength, and/or fabric layers. The track-engaging assembly comprises wheels and in some cases slide rails around which the track is driven.

Various considerations are important when it comes to use and performance of a snowmobile's track.

For example, traction generated by the track is a significant factor. The track typically comprises traction projections (sometimes referred to as "traction profiles" or "traction lugs") on its ground-engaging outer side to enhance traction. While they are useful, the traction projections may be limited in size and/or number to manage the track's weight and/or for other reasons.

As another example, a shape of the track's body may affect performance. For instance, the track's body is thin to facilitate its motion around the snowmobile's track-engaging assembly (e.g., to reduce power consumption). However, the thinness of the track's body may limited because of the track's manufacturing process and the reinforcements embedded in the track's body.

Similar considerations may arise for all-terrain vehicles (ATVs) equipped with track systems having tracks providing traction to the ATVs on the ground (e.g., an ATV equipped with two front track systems in place of two front wheels and two rear track systems in place of two rear wheels) and/or for other types of off-road vehicles.

While certain developments have been made to improve performance of tracks for snowmobiles, ATVs and other off-road vehicles, there remains a need for improvements in such tracks.

SUMMARY

In accordance with an aspect of the invention, there is provided a track for traction of an off-road vehicle. The track is mountable around a track-engaging assembly of the off-road vehicle. The track-engaging assembly comprises a drive wheel for driving the track. The track is elastomeric to be flexible around the track-engaging assembly. The track comprises: an inner surface for facing the track-engaging assembly; a ground-engaging outer surface for engaging the ground; and a plurality of traction projections projecting from the ground-engaging outer surface. A first one of the traction projections and a second one of the traction projections are spaced apart in a longitudinal direction of the track and offset from one another in a widthwise direction of the track. The second one of the traction projections succeeds the first one of the traction projections in the longitudinal direction of the track. A height of the first one of the traction projections is at least as great as a longitudinal spacing of the first one of the traction projections and the second one of the traction projections.

In accordance with another aspect of the invention, there is provided a track for traction of an off-road vehicle. The track is mountable around a track-engaging assembly of the off-road vehicle. The track-engaging assembly comprises a drive wheel for driving the track. The track is elastomeric to be flexible around the track-engaging assembly. The track comprises: an inner surface for facing the track-engaging assembly; a ground-engaging outer surface for engaging the ground; and a plurality of traction projections projecting from the ground-engaging outer surface. The traction projections are arranged in a plurality of traction projection rows that are spaced apart in a longitudinal direction of the track. A first one of the traction projections and a second one of the traction projections are spaced apart in the longitudinal direction of the track and generally aligned with one another in a widthwise direction of the track. A height of the first one of the traction projections is at least as great as a ratio of (i) a longitudinal spacing of the first one of the traction projections and the second one of the traction projections over (ii) a number of traction projection row transitions from the first one of the traction projections to the second one of the traction projections.

In accordance with another aspect of the invention, there is provided a track for traction of an off-road vehicle. The track is mountable around a track-engaging assembly of the off-road vehicle. The track-engaging assembly comprises a drive wheel for driving the track. The track is elastomeric to be flexible around the track-engaging assembly. The track comprises: an inner surface for facing the track-engaging assembly; a ground-engaging outer surface for engaging the ground; and a plurality of traction projections projecting from the ground-engaging outer surface. A first one of the traction projections and a second one of the traction projections are spaced apart in a longitudinal direction of the track. The second one of the traction projections succeeds the first one of the traction projections in the longitudinal direction of the track. A height of the first one of the traction projections is at least as great as a longitudinal spacing of the first one of the traction projections and the second one of the traction projections.

In accordance with another aspect of the invention, there is provided a track for traction of an off-road vehicle. The track is mountable around a track-engaging assembly of the off-road vehicle. The track-engaging assembly comprises a drive wheel for driving the track. The track is elastomeric to be flexible around the track-engaging assembly. The track comprises: an inner surface for facing the track-engaging assembly; a ground-engaging outer surface for engaging the ground; and a plurality of traction projections projecting from the ground-engaging outer surface. A height of each traction projection of the traction projections is greater than a thickness of the track from the inner surface to the ground-engaging outer surface. The thickness of the track is no more than 0.20 inches.

In accordance with another aspect of the invention, there is provided a track for traction of an off-road vehicle. The track is mountable around a track-engaging assembly of the off-road vehicle. The track-engaging assembly comprises a drive wheel for driving the track. The track is elastomeric to be flexible around the track-engaging assembly. The track comprises: an inner surface for facing the track-engaging assembly; a ground-engaging outer surface for engaging the ground; a plurality of traction projections projecting from the ground-engaging outer surface; and a reinforcement embedded between the inner surface and the ground-engaging outer surface. At least part of the reinforcement is located below a level of the ground-engaging outer surface underneath each traction projection of the traction projections.

In accordance with another aspect of the invention, there is provided a track for traction of an off-road vehicle. The track is mountable around a track-engaging assembly of the off-road vehicle. The track-engaging assembly comprises a drive wheel for driving the track. The track is elastomeric to be flexible around the track-engaging assembly. The track comprises: an inner surface for facing the track-engaging assembly; a ground-engaging outer surface for engaging the ground; a plurality of traction projections projecting from the ground-engaging outer surface; and a reinforcement embedded between the inner surface and the ground-engaging outer surface. A gradient of the reinforcement underneath each traction projection of the traction projections is at least 0.6.

In accordance with another aspect of the invention, there is provided a track for traction of an off-road vehicle. The track is mountable around a track-engaging assembly of the off-road vehicle. The track-engaging assembly comprises a drive wheel for driving the track. The track is elastomeric to be flexible around the track-engaging assembly. The track comprises: an inner surface for facing the track-engaging assembly; a ground-engaging outer surface for engaging the ground; a plurality of traction projections projecting from the ground-engaging outer surface; and a reinforcement embedded between the inner surface and the ground-engaging outer surface. For each traction projection of the traction projections, a ratio of (i) a distance from the reinforcement to a level of the ground-engaging outer surface at an extremity of the traction projection in a longitudinal direction of the track over (ii) a distance from the reinforcement to level of the ground-engaging outer surface at a longitudinal midpoint between the traction projection and an adjacent one of the traction projections that succeeds the traction projection in the longitudinal direction of the track is between 0.9 and 1.1.

In accordance with another aspect of the invention, there is provided a track for traction of an off-road vehicle. The track is mountable around a track-engaging assembly of the off-road vehicle. The track-engaging assembly comprises a drive wheel for driving the track. The track is elastomeric to be flexible around the track-engaging assembly. The track comprises: an inner surface for facing the track-engaging assembly; a ground-engaging outer surface for engaging the ground; a plurality of traction projections projecting from the ground-engaging outer surface; a first reinforcement embedded between the inner surface and the ground-engaging outer surface; and a second reinforcement embedded between the inner surface and the ground-engaging outer surface and spaced from the first reinforcement in a thickness direction of the track. For each traction projection of the traction projections, a ratio of (i) a distance between the first reinforcement and the second reinforcement in the thickness direction of the track at an extremity of the traction projection in a longitudinal direction of the track over (ii) a distance between the first reinforcement and the second reinforcement in the thickness direction of the track at a longitudinal midpoint between the traction projection and an adjacent one of the traction projections that succeeds the traction projection in the longitudinal direction of the track is between 0.9 and 1.1.

In accordance with another aspect of the invention, there is provided a method of manufacturing a track for traction of an off-road vehicle, The track is mountable around a track-engaging assembly of the off-road vehicle. The track-engaging assembly comprises a drive wheel for driving the track. The track is elastomeric to be flexible around the track-engaging assembly. The method comprises: providing a plurality of layers of elastomeric material in a mold; and providing a plurality of distinct pieces of elastomeric material in the mold. The distinct pieces of elastomeric material are spaced apart from one another in a longitudinal direction of the track. The method comprises molding the track in the mold such that: (i) the layers of elastomeric material form at least part of an inner surface of the track and a ground-engaging outer surface of the track; and (ii) the distinct pieces of elastomeric material form at least part of respective ones of a plurality of traction projections projecting from the ground-engaging outer surface of the track.

These and other aspects of the invention will now become apparent to those of ordinary skill in the art upon review of the following description of embodiments of the invention in conjunction with the accompanying drawings.

BRIEF DESCRIPTION OF THE DRAWINGS

A detailed description of embodiments of the invention is provided below, by way of example only, with reference to the accompanying drawings, in which.

It is to be expressly understood that the description and drawings are only for the purpose of illustrating certain embodiments of the invention and are an aid for understanding. They are not intended to be a definition of the limits of the invention.

DETAILED DESCRIPTION OF EMBODIMENTS

Figure 1:
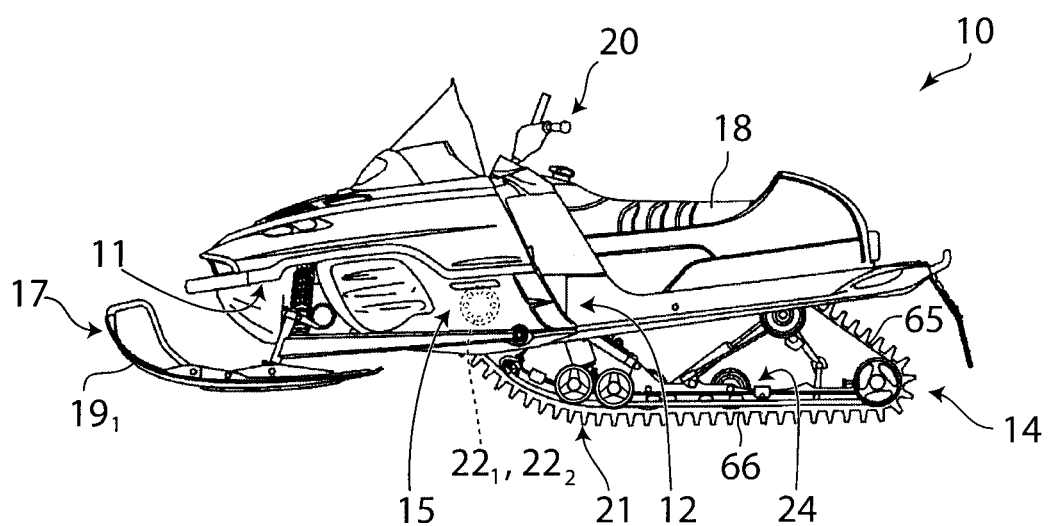
FIG. 1 shows an example of a snowmobile comprising a track system in accordance with an embodiment of the invention.

FIG. 1 shows an example of a snowmobile 10 in accordance with an embodiment of the invention. The snowmobile 10 is designed for travelling on snow and in some cases ice. In this embodiment, the snowmobile 10 comprises a frame 11, a powertrain 12, a track system 14, a ski assembly 17, a seat 18, and a user interface 20, which enables a user to control the snowmobile 10.

The powertrain 12 is configured for generating motive power and transmitting motive power to the track system 14 to propel the snowmobile 10 on the ground. To that end, the powertrain 12 comprises a prime mover 15, which is a source of motive power that comprises one or more motors (e.g., an internal combustion engine, an electric motor, etc.). For example, in this embodiment, the prime mover 15 comprises an internal combustion engine. In other embodiments, the prime mover 15 may comprise another type of motor (e.g., an electric motor) or a combination of different types of motor (e.g., an internal combustion engine and an electric motor). The prime mover 15 is in a driving relationship with the track system 14 That is, the powertrain 12 transmits motive power from the primer mover 15 to the track system 14 in order to drive (i.e., impart motion to) the track system 14.

The ski assembly 17 is turnable to allow steering of the snowmobile 10. In this embodiment, the ski assembly 17 comprises a pair of skis $19_1$, $19_2$ connected to the frame 11 via a front suspension unit.

The seat 18 accommodates the user of the snowmobile 10. In this case, the seat 18 is a straddle seat and the snowmobile 10 is usable by a single person such that the seat 18 accommodates only that person driving the snowmobile 10. In other cases, the seat 18 may be another type of seat, and/or the snowmobile 10 may be usable by two individuals, namely one person driving the snowmobile 10 and a passenger, such that the seat 18 may accommodate both of these individuals (e.g., behind one another) or the snowmobile 10 may comprise an additional seat for the passenger.

The user interface 20 allows the user to interact with the snowmobile 10 to control the snowmobile 10. More particularly, the user interface 20 comprises an accelerator, a brake control, and a steering device that are operated by the user to control motion of the snowmobile 10 on the ground. In this case, the steering device comprises handlebars, although it may comprise a steering wheel or other type of steering element in other cases. The user interface 20 also comprises an instrument panel (e.g., a dashboard) which provides indicators (e.g., a speedometer indicator, a tachometer indicator, etc.) to convey information to the user.

Figure 2:
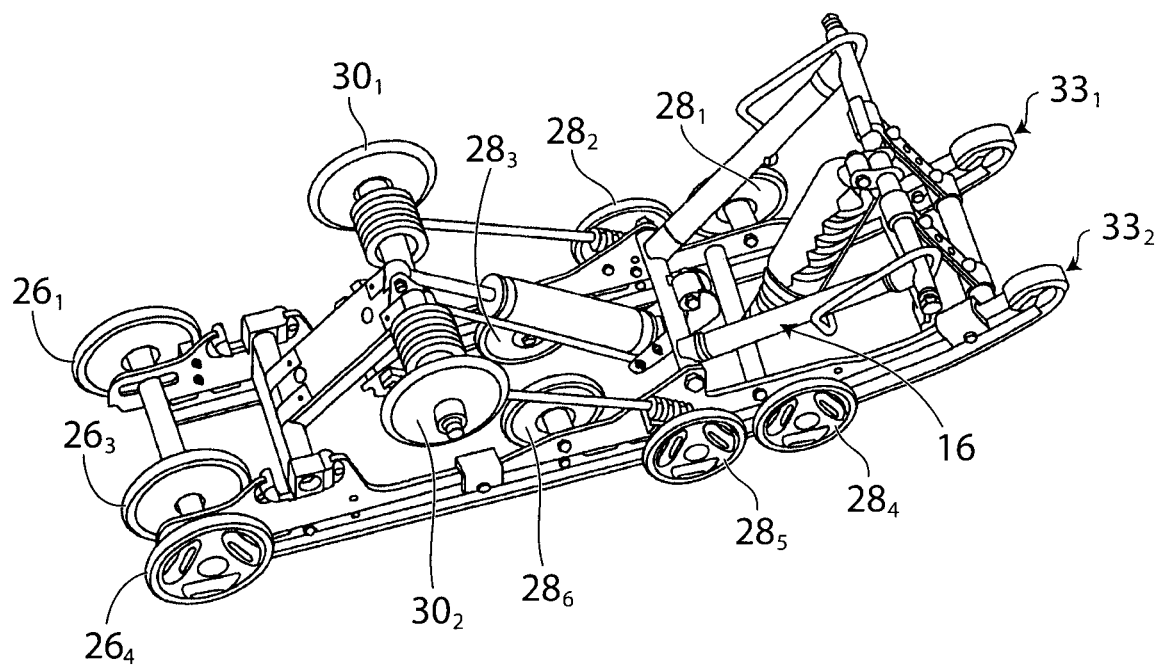
FIG. 2 shows a perspective view of components of the track system.
Figure 3:
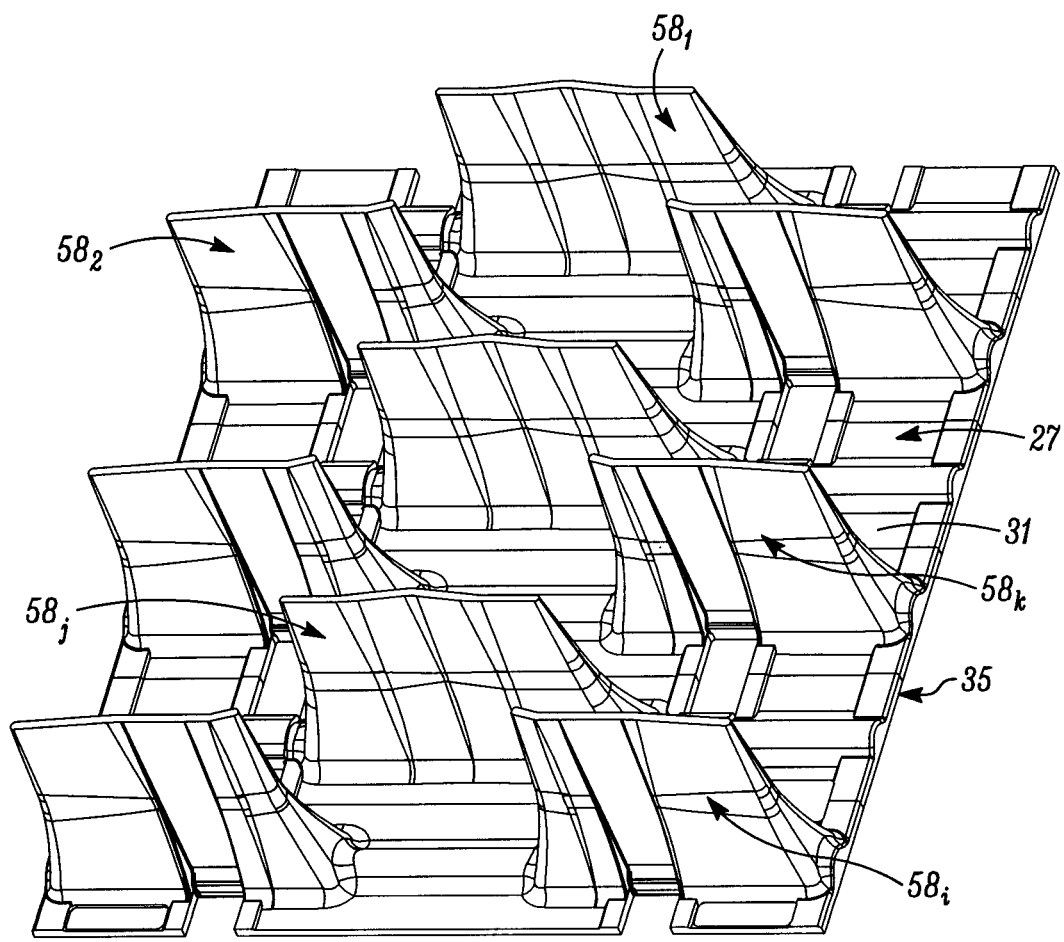
FIGS. 3 to 6 respectively show a perspective view, a plan view, an elevation view, and a longitudinal cross-sectional view of part of a track of the track system.
Figure 4:
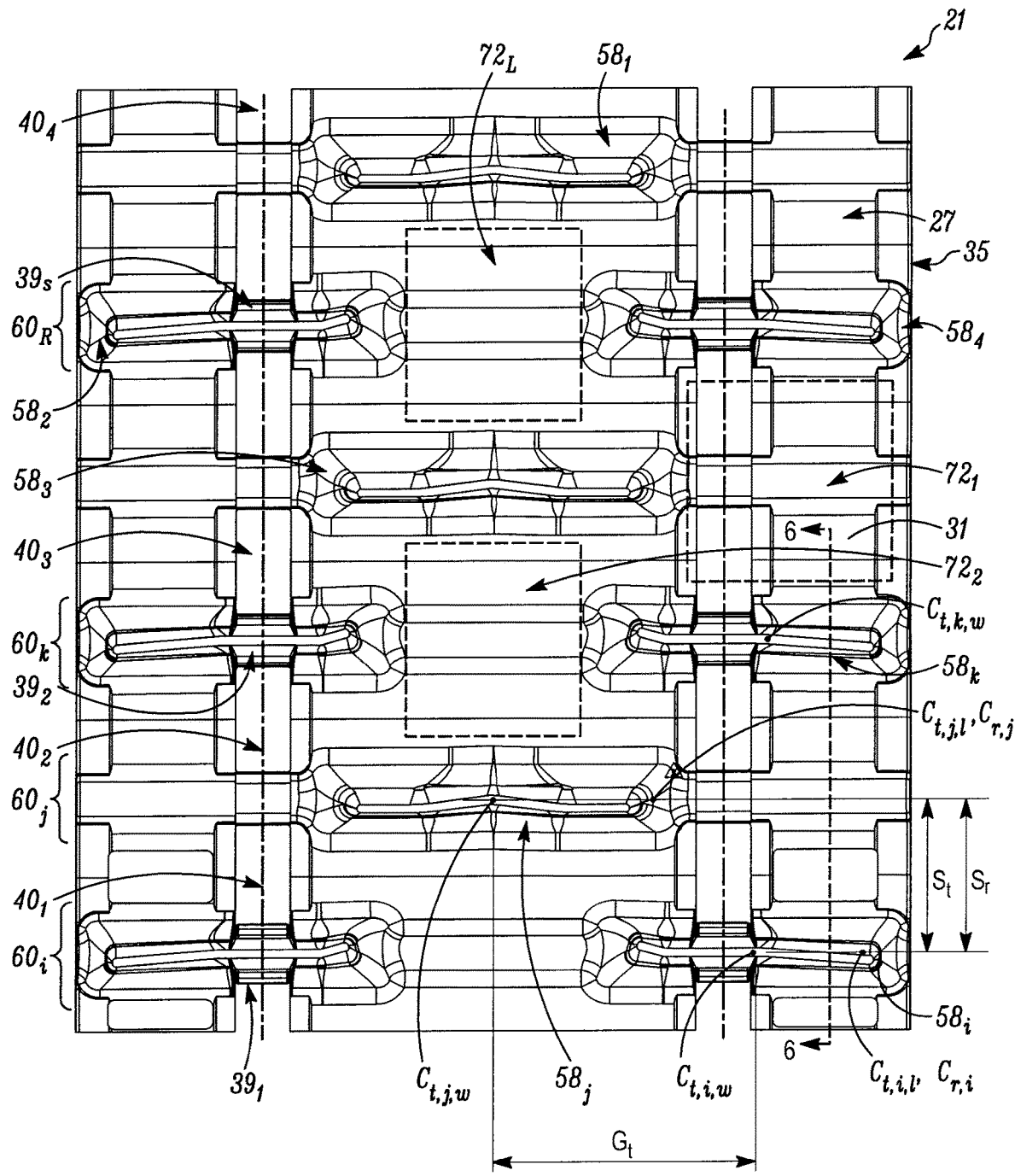
Figure 5:
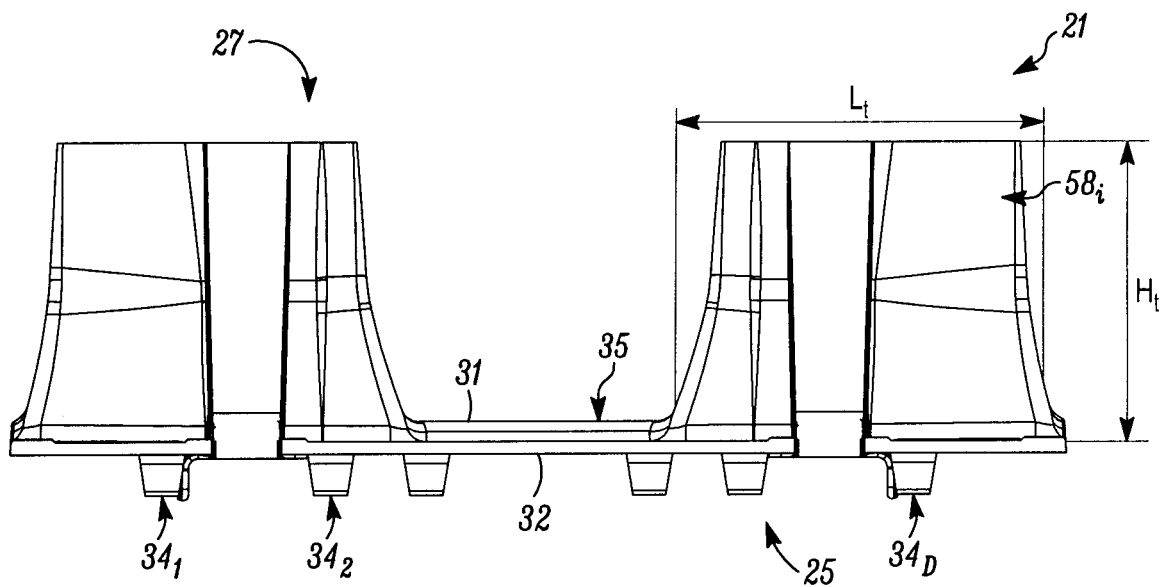
Figure 6:
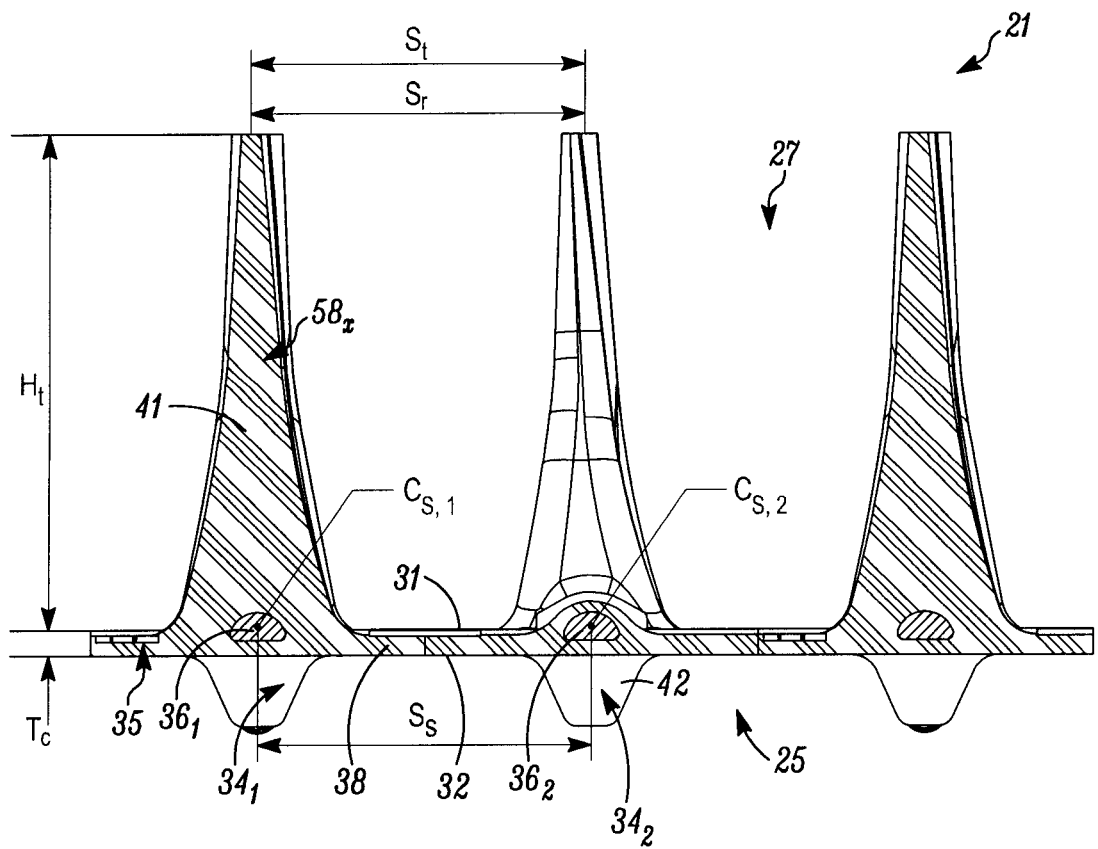

The track system 14 engages the ground to generate traction of the snowmobile 10. In this embodiment, the track system 14 comprises a track-engaging assembly 24 and a track 21 disposed around the track-engaging assembly 24. More particularly, in this embodiment, with additional reference to FIG. 2, the track-engaging assembly 24 comprises a plurality of wheels, including a plurality of drive wheels $22_1$, $22_2$ and a plurality of idler wheels, which includes rear idler wheels $26_1$-$26_4$, lower roller wheels $28_1$-$28_6$, and upper roller wheels $30_1$, $30_2$. The track-engaging assembly 24 also comprises a plurality of slide rails $33_1$, $33_2$. Various components of the track-engaging assembly 24, including the idler wheels $26_1$-$26_4$, $28_1$-$28_6$, $30_1$, $30_2$ and the slide rails $33_1$, $33_2$ are supported by a suspension unit 16. The track system 14 has a longitudinal direction and a first longitudinal end and a second longitudinal end that define a length of the track system 14. The track system 14 has a widthwise direction and a width that is defined by a width of the track 21. The track system 14 has a height direction that is normal to its longitudinal direction and its widthwise direction.

The track 21 engages the ground to provide traction to the snowmobile 10. As further discussed below, in this embodiment, the track 21 may be designed and constructed to enhance traction and/or provide other benefits.

A length of the track 21 allows the track 21 to be mounted around the track-engaging assembly 24. In view of its closed configuration without ends that allows it to be disposed and moved around the track-engaging assembly 24, the track 21 can be referred to as an "endless" track. With additional reference to FIGS. 3 to 6, the track 21 comprises an inner side 25 and a ground-engaging outer side 27. The inner side 25 faces the wheels $22_1$, $22_2$, $26_1$-$26_4$, $28_1$-$28_6$, $30_1$, $30_2$ and the slide rails $33_1$, $33_2$. The ground-engaging outer side 27 engages the ground. A top run 65 of the track 21 extends between the longitudinal ends of the track system 14 and over the wheels $22_1$, $22_2$, $28_1$-$28_4$, $28_1$-$28_6$, $30_1$, $30_2$, and a bottom run 66 of the track 21 extends between the longitudinal ends of the track system 14 and under the wheels $22_1$, $22_2$, $26_1$-$26_4$, $28_1$-$28_6$, $30_1$, $30_2$ and the slide rails $33_1$, $33_2$. The track 21 has a longitudinal axis which defines a longitudinal direction of the track 21 (i.e., a direction generally parallel to its longitudinal axis) and transversal directions of the track (i.e., directions transverse to its longitudinal axis), including a widthwise direction of the track (i.e., a lateral direction generally perpendicular to its longitudinal axis). The track 21 has a thickness direction normal to its longitudinal and widthwise directions.

The track 21 is elastomeric, i.e., comprises elastomeric material, to be flexible around the track-engaging assembly 24. The elastomeric material of the track 21 can include any polymeric material with suitable elasticity. In this embodiment, the elastomeric material of the track 21 includes rubber. Various rubber compounds may be used and, in some cases, different rubber compounds may be present in different areas of the track 21. In other embodiments, the elastomeric material of the track 21 may include another elastomer in addition to or instead of rubber (e.g., polyurethane elastomer).

More particularly, the track 21 comprises an endless body 35 underlying its inner side 25 and ground-engaging outer side 27. In view of its underlying nature, the body 35 will be referred to as a "carcass". The carcass 35 is elastomeric in that it comprises elastomeric material 38 which allows the carcass 35 to elastically change in shape and thus the track 21 to flex as it is in motion around the track-engaging assembly 24. The elastomeric material 38 can be any polymeric material with suitable elasticity. In this embodiment, the elastomeric material 38 includes rubber. Various rubber compounds may be used and, in some cases, different rubber compounds may be present in different areas of the carcass 35. In other embodiments, the elastomeric material 38 may include another elastomer in addition to or instead of rubber (e.g., polyurethane elastomer).

Figure 7:
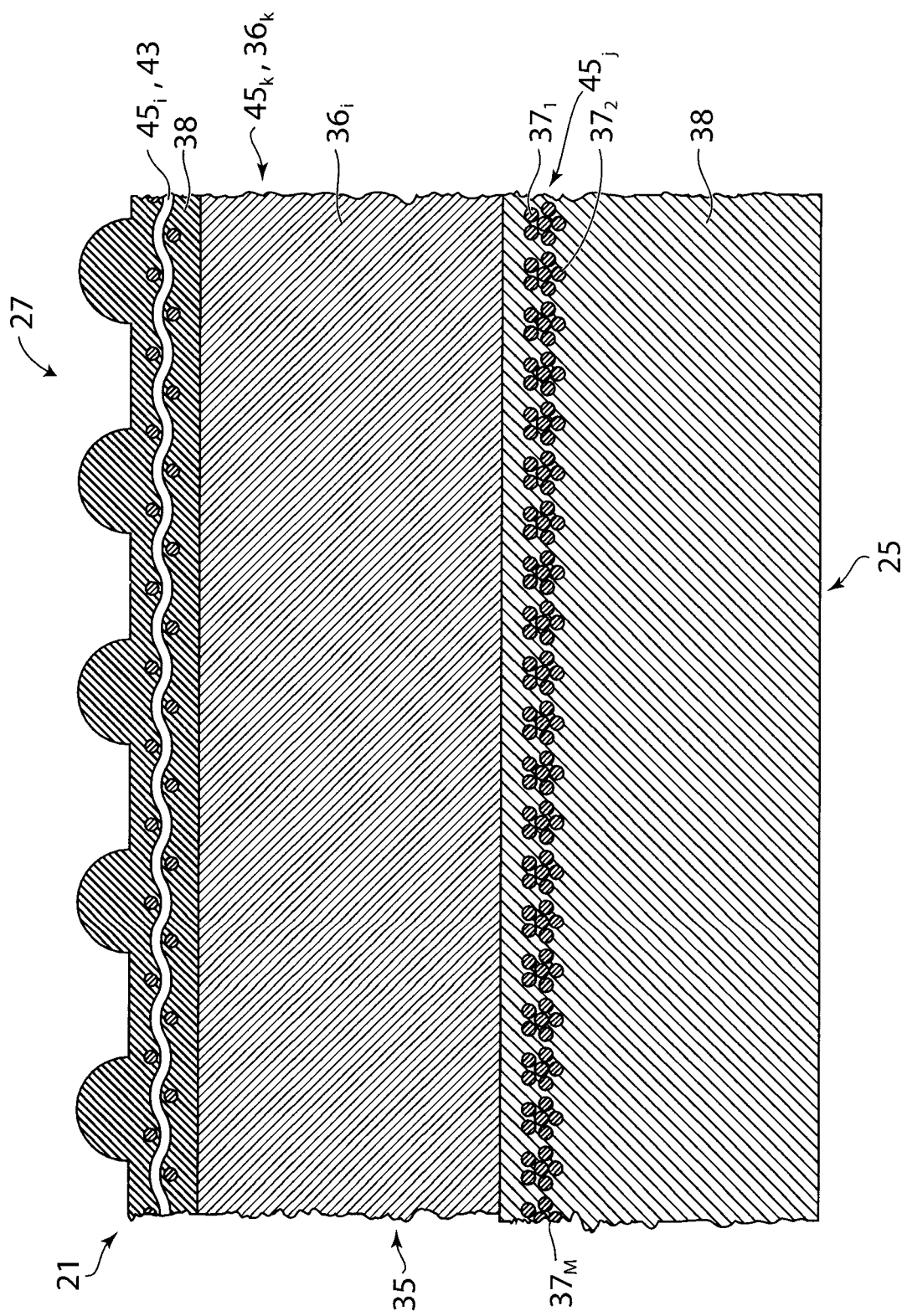
FIG. 7 shows a widthwise cross-sectional view of part of the track.

In this embodiment, with additional reference to FIG. 7 the carcass 35 comprises a plurality of reinforcements $45_1$-$45_P$ embedded in its rubber 38. These reinforcements $45_1$-$45_P$ can take on various forms.

For example, in this embodiment, a subset of the reinforcements $45_1$-$45_P$ is a plurality of transversal stiffening rods $36_1$-$36_N$ that extend transversally to the longitudinal direction of the track 21 to provide transversal rigidity to the track 21. More particularly, in this embodiment, the transversal stiffening rods $36_1$-$36_N$ extend in the widthwise direction of the track 21. Each of the transversal stiffening rods $36_1$-$36_N$ may have various shapes and be made of any suitably rigid material (e.g., metal, polymer or composite material).

As another example, in this embodiment, the reinforcement $45_i$ is a layer of reinforcing cables $37_1$-$37_M$ that are adjacent to one another and extend generally in the longitudinal direction of the track 21 to enhance strength in tension of the track 21 along its longitudinal direction. In this case, each of the reinforcing cables $37_1$-$37_M$ is a cord including a plurality of strands (e.g., textile fibers or metallic wires). In other cases, each of the reinforcing cables $37_1$-$37_M$ may be another type of cable and may be made of any material suitably flexible longitudinally (e.g., fibers or wires of metal, plastic or composite material). In some examples of implementation, respective ones of the reinforcing cables $37_1$-$37_M$ may be constituted by a single continuous cable length wound helically around the track 21. In other examples of implementation, respective ones of the transversal cables $37_1$-$37_M$ may be separate and independent from one another (i.e., unconnected other than by rubber of the track 21).

As yet another example, in this embodiment, the reinforcement $45_j$ is a layer of reinforcing fabric 43. The reinforcing fabric 43 comprises thin pliable material made usually by weaving, felting, knitting, interlacing, or otherwise crossing natural or synthetic elongated fabric elements, such as fibers, filaments, strands and/or others, such that some elongated fabric elements extend transversally to the longitudinal direction of the track 21 to have a reinforcing effect in a transversal direction of the track 21. For instance, the reinforcing fabric 43 may comprise a ply of reinforcing woven fibers (e.g., nylon fibers or other synthetic fibers). For example, the reinforcing fabric 43 may protect the transversal stiffening rods $36_1$-$36_N$, improve cohesion of the track 21, and counter its elongation.

The carcass 35 may be molded into shape in a molding process during which the rubber 38 is cured. For example, in this embodiment, a mold may be used to consolidate layers of rubber providing the rubber 38 of the carcass 35, the reinforcing cables $37_1$-$37_M$ and the layer of reinforcing fabric 43.

In this embodiment, the track 21 is a one-piece "jointless" track such that the carcass 35 is a one-piece jointless carcass. In other embodiments, the track 21 may be a "jointed" track (i.e., having at least one joint connecting adjacent parts of the track 21) such that the carcass 35 is a jointed carcass (i.e., which has adjacent parts connected by the at least one joint). For example, in some embodiments, the track 21 may comprise a plurality of track sections interconnected to one another at a plurality of joints, in which case each of these track sections includes a respective part of the carcass 35. In other embodiments, the track 21 may be a one-piece track that can be closed like a belt with connectors at both of its longitudinal ends to form a joint.

The ground-engaging outer side 27 of the track 21 comprises a ground-engaging outer surface 31 of the carcass 35 and a plurality of traction projections $58_1$-$58_T$ that project outwardly from the ground-engaging outer surface 31 to enhance traction on the ground. The traction projections $58_1$-$58_T$, which can be referred to as "traction lugs" or "traction profiles", may have any suitable shape (e.g., straight shapes, curved shapes, shapes with straight parts and curved parts, etc.).

In this embodiment, each of the traction projection $58_1$-$58_T$ is an elastomeric traction projection in that it comprises elastomeric material 41. The elastomeric material 41 can be any polymeric material with suitable elasticity. More particularly, in this embodiment, the elastomeric material 41 includes rubber. Various rubber compounds may be used and, in some cases, different rubber compounds may be present in different areas of each of the traction projections $58_1$-$58_T$. In other embodiments, the elastomeric material 41 may include another elastomer in addition to or instead of rubber (e.g., polyurethane elastomer).

The traction projections $58_1$-$58_T$ may be provided on the ground-engaging outer side 27 in various ways. For example, in this embodiment, the traction projections $58_1$-$58_T$ are provided on the ground-engaging outer side 27 by being molded with the carcass 35.

The inner side 25 of the track 21 comprises an inner surface 32 of the carcass 35 and a plurality of inner projections $34_1$-$34_D$ that project inwardly from the inner surface 32 and are positioned to contact at least some of the wheels $22_1$, $22_2$, $26_1$-$26_4$, $28_1$-$28_6$, $30_1$, $30_2$ and/or some of the slide rails $33_1$, $33_2$ to do at least one of driving (i.e., imparting motion to) the track 21 and guiding the track 21. Since each of them is used to do at least one of driving the track 21 and guiding the track 21, the inner projections $34_1$-$34_D$ can be referred to as "drive/guide projections" or "drive/guide lugs". In some cases, a drive/guide lug $34_i$ may interact with a given one of the drive wheels $22_1$, $22_2$ to drive the track 21, in which case the drive/guide lug $34_i$ is a drive lug. In other cases, a drive/guide lug $34_i$ may interact with a given one of the idler wheels $26_1$-$26_4$, $28_1$-$28_2$, $30_1$, $30_2$ and/or a given one of the slide rails $33_1$, $33_2$ to guide the track 21 to maintain proper track alignment and prevent de-tracking without being used to drive the track 21, in which case the drive/guide lug $34_i$ is a guide lug. In yet other cases, a drive/guide lug $34_i$ may both (i) interact with a given one of the drive wheels $22_1$, $22_3$ to drive the track 21 and (ii) interact with a given one of the idler wheels $26_1$-$26_4$, $28_1$-$28_6$, $30_1$, $30_2$ and/or a given one of the slide rails $33_1$, $33_2$ to guide the track 21, in which case the drive/guide lug $34_i$ is both a drive lug and a guide lug.

In this embodiment, each of the drive/guide lugs $34_1$-$34_D$ is an elastomeric drive/guide lug in that it comprises elastomeric material 42. The elastomeric material 42 can be any polymeric material with suitable elasticity. More particularly, in this embodiment, the elastomeric material 42 includes rubber. Various rubber compounds may be used and, in some cases, different rubber compounds may be present in different areas of each of the drive/guide lugs $34_1$-$34_D$. In other embodiments, the elastomeric material 42 may include another elastomer in addition to or instead of rubber (e.g., polyurethane elastomer).

The drive/guide lugs $34_1$-$34_D$ may be provided on the inner side 25 in various ways. For example, in this embodiment, the drive/guide lugs $34_1$-$34_D$ are provided on the inner side 25 by being molded with the carcass 35.

The carcass 35 has a thickness $T_c$ which is relatively small. The thickness $T_c$ of the carcass 35 is measured from the inner surface 32 to the ground-engaging outer surface 31 of the carcass 35 between longitudinally-adjacent ones of the traction projections $58_1$-$58_T$. For example, in some embodiments, the thickness $T_c$ of the carcass 35 may be no more than 0.25 inches, in some cases no more than 0.22 inches, in some cases no more than 0.20 inches, and in some cases even less (e.g., no more than 0.18 or 0.16 inches). The thickness $T_c$ of the carcass 35 may have any other suitable value in other embodiments.

Each of the drive wheels $22_1$, $22_2$ is rotatable on an axle of the snowmobile 10 for driving the track 21. That is, power generated by the prime mover 15 and delivered over the powertrain 12 of the snowmobile 10 rotates the axle, which rotates the drive wheels $22_1$, $22_2$, which impart motion of the track 21. In this embodiment, each drive wheel $22_i$ comprises a drive sprocket engaging some of the drive/guide lugs $34_1$-$34_D$ of the inner side 25 of the track 21 in order to drive the track 21. In other embodiments, the drive wheel $22_i$ may be configured in various other ways. For example, in embodiments where the track 21 comprises drive holes, the drive wheel $22_i$ may have teeth that enter these holes in order to drive the track 21. As yet another example, in some embodiments, the drive wheel $22_i$ may frictionally engage the inner side 25 of the track 21 in order to frictionally drive the track 21. The drive wheels $22_1$, $22_2$ may be arranged in other configurations and/or the track system 14 may comprise more or less drive wheels (e.g., a single drive wheel, more than two drive wheels, etc.) in other embodiments.

The idler wheels $26_1$-$26_4$, $28_1$-$28_6$, $30_1$, $30_2$ are not driven by power supplied by the prime mover 15, but are rather used to do at least one of guiding the track 21 as it is driven by the drive wheels $22_1$, $22_2$, tensioning the track 21, and supporting part of the weight of the snowmobile 10 on the ground via the track 21. More particularly, in this embodiment, the rear idler wheels $26_1$-$26_4$ are trailing idler wheels that maintain the track 21 in tension, guide the track 21 as it wraps around them, and can help to support part of the weight of the snowmobile 10 on the ground via the track 21. The lower roller wheels $28_1$-$28_6$ roll on the inner side 25 of the track 21 along the bottom run 66 of the track 21 to apply the bottom run 66 on the ground. The upper roller wheels $30_1$, $30_2$ roll on the inner side 25 of the track 21 along the top run 65 of the track 21 to support and guide the top run 65 as the track 21 moves. The idler wheels $26_1$-$26_4$, $28_1$-$28_6$, $30_1$, $30_2$ may be arranged in other configurations and/or the track assembly 14 may comprise more or less idler wheels in other embodiments.

The slide rails $33_1$, $33_2$ slide on the inner side 25 of the track 21 along the bottom run 66 of the track 21 to apply the bottom run 66 onto the ground. In this embodiment, the slide rails $33_1$, $33_2$ are curved upwardly in a front region of the track system 14 to guide the track 21 towards the drive wheels $22_1$, $22_2$. In some cases, the track 21 may comprise slide members $39_1$-$39_S$ that slide against the slide rails $33_1$, $33_2$ to reduce friction. The slide members $39_1$-$39_S$, which can sometimes be referred to as "clips", may be mounted via holes $40_1$-$40_H$ arranged in two rows extending longitudinally and spaced apart laterally of the track 21. In other cases, the track 21 may be free of such slide members. The slide rails $33_1$, $33_2$ may be arranged in other configurations and/or the track assembly 14 may comprise more or less slide rails in other embodiments.

The traction projections $58_1$-$58_T$ are arranged on the ground-engaging outer side 27 of the track 21 to enhance traction of the track 21.

Respective ones of the traction projections $58_1$-$58_T$ (e.g., the traction projections $58_1$, $58_2$, $58_3$) are spaced apart in the longitudinal direction of the track 21. A longitudinal spacing $S_t$ of a traction projection $58_i$ and a traction projection $58_j$ that are spaced apart in the longitudinal direction of the track 21, which is a distance between a center $C_{t,i,l}$ of the traction projection $58_i$ in the longitudinal direction of the track 21 and a center $C_{t,j,l}$ of the traction projection $58_j$ in the longitudinal direction of the track 21, may have any suitable value.

In this embodiment, the traction projections $58_1$-$58_T$ are arranged in a plurality of rows $60_1$-$60_R$, referred to as "traction projection rows", that extend transversally to and are spaced apart in the longitudinal direction of the track 21. The ground-engaging outer side 27 comprises regions $62_1$-$62_F$ free of traction projections in between the traction projection rows $60_1$-$60_R$, i.e., there are no traction projections like the traction projections $58_1$-$58_T$ projecting from the ground-engaging outer surface 31 of the carcass 35 in these "traction-projection-free" regions $62_1$-$62_F$.

A longitudinal spacing $S_r$ of a traction projection row $60_i$ and a traction projection row $60_j$ that succeeds the traction projection row $60_i$, which is a distance between a center $C_{r,i}$ of the traction projection row $60_i$ in the longitudinal direction of the track 21 and a center $C_{r,j}$ of the traction projection row $60_j$ in the longitudinal direction of the track 21, may have any suitable value. For example, in some embodiments, the longitudinal spacing $S_r$ of the traction projection rows $60_i$, $60_j$ may be at least 2.5 inches, in some cases at least 2.8 inches, in some cases at least 3 inches, and in some cases even more (e.g., at least 3.5 inches). In this example, the longitudinal spacing $S_r$ of adjacent ones of the traction projection rows $60_1$-$60_R$ is uniform such that the longitudinal spacing $S_r$ can be viewed as a "pitch" of the traction projection rows $60_1$-$60_R$. In other examples, the longitudinal spacing $S_r$ of adjacent ones of the traction projection rows $60_1$-$60_R$ may vary along the track 21. Also, in this case, the longitudinal spacing $S_r$ of adjacent ones of the traction projection rows $60_1$-$60_R$ corresponds to the longitudinal spacing $S_t$ of traction projections $58_i$, $58_j$ that are part of these rows. In other cases, the longitudinal spacing $S_r$ of adjacent ones of the traction projection rows $60_1$-$60_R$ may be different from the longitudinal spacing $S_t$ of traction projections $58_i$, $58_j$ that are part of these rows, depending on shapes of these traction projections.

In this example of implementation, the traction projection rows $60_1$-$60_R$ are generally aligned in the longitudinal direction of the track 21 with the transversal stiffening rods $36_1$-$36_N$. That is, each of the traction projection rows $60_1$-$60_R$ overlaps with a respective one of the transversal stiffening rods $36_1$-$36_N$ in the longitudinal direction of the track 21. A longitudinal spacing $S_s$ of a transversal stiffening rod $36_i$ and a transversal stiffening rod $36_j$ that succeeds the transversal stiffening rod $36_i$, which is a distance between a center $C_{s,i}$ of the transversal stiffening rod $36_i$ in the longitudinal direction of the track 21 and a center $C_{s,j}$ of the transversal stiffening rod $36_j$ in the longitudinal direction of the track 21, is thus related to the longitudinal spacing $S_r$ of the traction projection rows $60_i$, $60_j$ located where the transversal stiffening rods $36_i$, $36_j$ are located. For instance, in this case, the longitudinal spacing $S_s$ of the transversal stiffening rods $36_i$, $36_j$ substantially corresponds to the longitudinal spacing $S_r$ of the traction projection rows $60_i$, $60_j$. In other cases, the longitudinal spacing $S_s$ of the transversal stiffening rods $36_i$, $36_j$ may differ from the longitudinal spacing $S_r$ of the traction projection rows $60_i$, $60_j$. In other examples of implementation, one or more (e.g., possibly all) of the traction projection rows $60_1$-$60_R$ may not be aligned in the longitudinal direction of the track 21 with any one of the transversal stiffening rods $36_1$-$36_N$, or the track 21 may be free of transversal stiffening rods.

Also, in this embodiment, respective ones of the traction projections $58_1$-$58_T$ (e.g., the traction projections $58_1$, $58_2$) are distributed in the widthwise direction of the track 21. Notably, in this embodiment, the traction projections $58_1$-$58_T$ are arranged in a staggered arrangement in which given ones of the traction projections $58_1$-$58_T$ are staggered relative to one another. This may help to enhance traction by providing large spaces $72_1$-$72_L$ for containing snow and/or other ground matter between longitudinally-succeeding ones of the traction projections $58_1$-$58_T$ which face one another and apply tractive forces on that snow and/or other ground matter.

More particularly, in this embodiment, a traction projection $58_i$ and a traction projection $58_j$ succeeding the traction projection $58_i$ in the longitudinal direction of the track 21 are offset from one another (i.e., nonaligned) in the widthwise direction of the track 21. That is, a center $C_{t,i,w}$ of the traction projection $58_i$ in the widthwise direction of the track 21 and a center $C_{t,j,w}$ of the traction projection $58_j$ in the widthwise direction of the track 21 are spaced apart in the widthwise direction of the track 21 by a distance $G_t$. At least a majority (i.e., a majority or an entirety) of the traction projection $58_i$ does not overlap with the traction projection $58_j$ in the widthwise direction of the track 21.

In addition, a traction projection $58_i$ and a traction projection $58_k$ that does not immediately follow the traction projection $58_i$ in the longitudinal direction of the track 21 are generally aligned with one another in the widthwise direction of the track 21. That is, a center $C_{t,i,w}$ of the traction projection $58_i$ in the widthwise direction of the track 21 and a center $C_{t,k,w}$ of the traction projection $58_k$ in the widthwise direction of the track 21 are generally aligned in the widthwise direction of the track 21. At least a majority (i.e., a majority or an entirety) of the traction projection $58_i$ overlaps with the traction projection $58_k$ the widthwise direction of the track 21.

In this example of implementation, the traction projections $58_1$-$58_T$ define a traction projection pattern 70 that repeats itself at every two of the traction projection rows $60_1$-$60_R$. In other examples of implementation, the traction projection pattern 70 defined by the traction projections $58_1$-$58_T$ may repeat itself at every three, four, five, or more of the traction projection rows $60_1$-$60_R$. In yet other examples of implementation, the traction projections $58_1$-$58_T$ may not define any discernible pattern that repeats itself (e.g., every one of the traction projection rows $60_1$-$60_R$ may have a unique configuration).

In this embodiment, the traction projections $58_1$-$58_T$ are very high to enhance traction. Each traction projection $58_x$ has a height $H_t$, which is measured from the ground-engaging outer surface 31 of the carcass 35 in the thickness direction of the track 21. The height $H_t$ of the traction projection $58_x$ is significantly greater than the thickness $T_c$ of the carcass 35. For example, in some embodiments, a ratio $H_t/T_c$ of the height $H_t$ of the traction projection $58_x$ over the thickness $T_c$ of the carcass 35 may be at least 15, in some cases at least 17, in some cases at least 20, in some cases at least 22, and in some cases even more (e.g., at least 25). For instance, in some embodiments, the height $H_t$ of the traction projection $58_x$ may be greater than 3 inches, in some cases at least 3.5 inches, in some cases at least 3.75 inches, in some cases at least 4 inches, in some cases at least 4.25 inch, and in some cases even more (e.g., at least 4.5 inches or 5 inches). The height $H_t$ of the traction projection $58_x$ and/or the ratio $H_t/T_c$ of the height $H_t$ of the traction projection $58_x$ over the thickness $T_c$ of the carcass 35 may have any other suitable value in other embodiments.

The height $H_t$ of the traction projection $58_x$, which is significant, increases an effective tractive area $A_t$ of the traction projection $58_x$ that applies tractive forces on the snow and/or other ground matter. The effective tractive area $A_t$ of the traction projection $58_x$ can be calculated as a product of the height $H_t$ of the traction projection $58_x$ and a length $L_t$ of the traction projection $58_x$.

Figure 8:
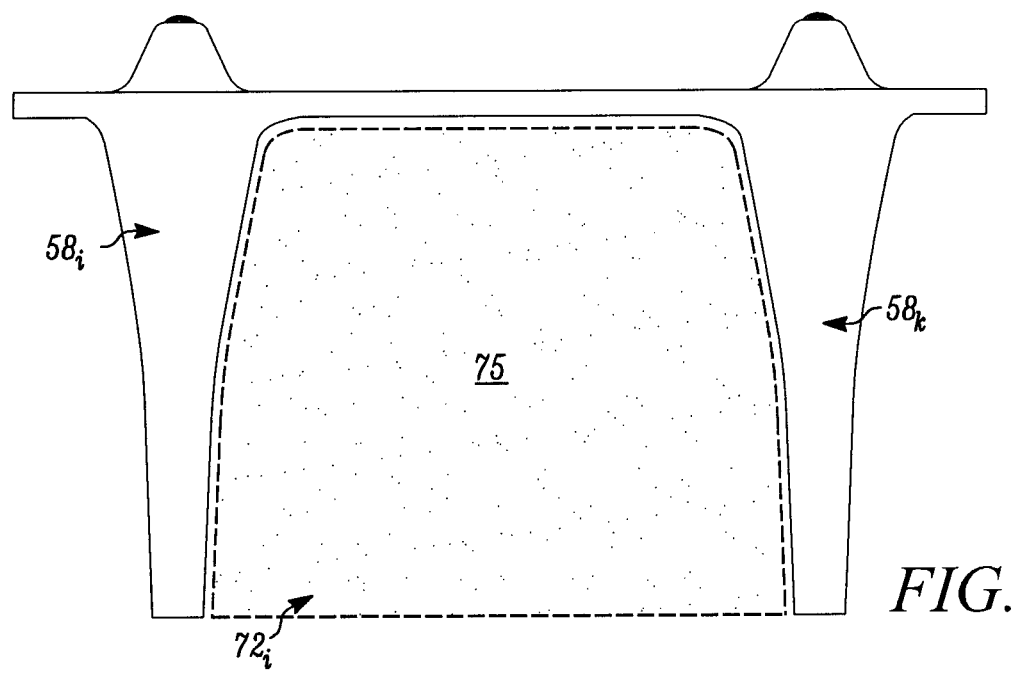
FIG. 8 shows an example of snow and/or other ground matter in a space between traction projections of the track.

Furthermore, in this example of implementation, the large spaces $72_1$-$72_L$ between longitudinally-succeeding ones of the traction projections $58_1$-$58_T$ that face one another provided by the staggered arrangement of the traction projections $58_1$-$58_T$ may help to better utilize the effective tractive area $A_t$ of each of the traction projections $58_1$-$58_T$. For instance, with additional reference to FIG. 8, each of the larger spaces $72_1$-$72_L$ may contain a mass of snow and/or other ground matter 75 that may be more suitably sized for tractive forces applied by the traction projections $58_1$-$58_T$ than if it was smaller. In other words, the mass of snow and/or other ground matter 75 in each of the larger spaces $72_1$-$72_L$ is both relatively deep (i.e., in the thickness direction of the track 21) and relatively long (i.e., in the longitudinal direction of the track 21) and may thus better handle tractive forces applied by the traction projections $58_1$-$58_T$ compared to if it was as deep but shorter.

More particularly, in this embodiment, the height $H_t$ of each traction projection $58_x$ is at least as great as the longitudinal spacing $S_r$ of adjacent traction projection rows $60_i$, $60_j$ (i.e., $H_t \geq S_r$). In this example of implementation, the height $H_t$ of the traction projection $58_x$ is greater than the longitudinal spacing $S_r$ of the adjacent traction projection rows $60_i$, $60_j$. For example, in some embodiments, a ratio $H_t/S_r$ of the height $H_t$ of the traction projection $58_x$ over the longitudinal spacing $S_r$ of the adjacent traction projection rows $60_i$, $60_j$ may be at least 1.1, in some cases at least 1.2, in some cases at least 1.3, and in some cases even more (e.g., at least 1.4 or more). The ratio $H_t/S_r$ of the height $H_t$ of the traction projection $58_x$ over the longitudinal spacing $S_r$ of the adjacent traction projection rows $60_i$, $60_j$ may have any other suitable value in other embodiments.

Since in this embodiment the longitudinal spacing $S_s$ of adjacent transversal stiffening rods $36_i$, $36_j$ is related to the longitudinal spacing $S_r$ of adjacent traction projection rows $60_i$, $60_j$, the height $H_t$ of each traction projection $58_x$ is at least as great as the longitudinal spacing $S_s$ of the adjacent transversal stiffening rods $36_i$, $36_j$ (i.e., $H_t \geq S_s$). In this example of implementation, the height $H_t$ of the traction projection $58_x$ is greater than the longitudinal spacing $S_s$ of the adjacent transversal stiffening rods $36_i$, $36_j$. For example, in some embodiments, a ratio $H_t/S_s$ of the height $H_t$ of the traction projection $58_x$ over the longitudinal spacing $S_s$ of the adjacent transversal stiffening rods $36_i$, $36_j$ may be at least 1.1, in some cases at least 1.2, in some cases at least 1.3, and in some cases even more (e.g., at least 1.4 or more). The ratio $H_t/S_s$ of the height $H_t$ of the traction projection $58_x$ over the longitudinal spacing $S_s$ of the adjacent transversal stiffening rods $36_i$, $36_j$ may have any other suitable value in other embodiments.

In this example of implementation, the height $H_t$ of a traction projection $58_i$ is at least as great as the longitudinal spacing $S_t$ of the traction projection $58_i$ and a traction projection $58_j$ that succeeds the traction projection $58_i$ in the longitudinal direction of the track 21 and that is offset from the traction projection $58_i$ in the widthwise direction of the track 21 (i.e., $H_t \geq S_t$). In this case, the height $H_t$ of the traction projection $58_i$ is greater than the longitudinal spacing $S_t$ of the longitudinally-successive widthwise-offset traction projections $58_i$, $58_j$. For instance, in some embodiments, a ratio $H_t/S_t$ of the height $H_t$ of the traction projection $58_i$ over the longitudinal spacing $S_t$ of the longitudinally-successive widthwise-offset traction projections $58_i$, $58_j$ may be at least 1.1, in some cases at least 1.2, in some cases at least 1.3, and in some cases even more (e.g., at least 1.4 or more). The ratio $H_t/S_t$ of the height $H_t$ of the traction projection $58_i$ over the longitudinal spacing $S_r$ of the longitudinally-successive widthwise-offset traction projections $58_i$, $58_j$ may have any other suitable value in other embodiments.

Also, in this example of implementation, the height $H_t$ of a traction projection $58_i$ is at least as great as, and in this case greater than, a ratio $S_t/N_r$ of (i) the longitudinal spacing $S_t$ of the traction projection $58_i$ and a traction projection $58_k$ that is spaced apart from the traction projection $58_i$ in the longitudinal direction of the track 21 and that is generally aligned with the traction projection $58_i$ in the widthwise direction of the track 21 over (ii) a number of traction projection row transitions $N_r$ from the traction projection $58_i$ to the traction projection $58_k$ (i.e., $H_t \geq S_t/N_r$). In this case, the number of traction projection row transitions $N_r$ between the traction projections $58_i$, $58_k$ is two ($N_r = 2$), namely one transition from the traction projection row $60_i$ to the traction projection row $60_j$ and one transition from the traction projection row $60_j$ to the traction projection row $60_k$. In other cases, the number of traction projection row transitions $N_r$ from the traction projection $58_i$ to the traction projection $58_k$ may have any other suitable value. For instance, in some embodiments, a ratio $H_t/(S_t/N_r)$ of the height $H_t$ of the traction projection $58_i$ over the ratio $S_t/N_r$ of (i) the longitudinal spacing $S_t$ of the traction projections $58_i$, $58_k$ over (ii) the number of traction projection row transitions $N_r$ between the traction projections $58_i$, $58_k$ may be at least 1.1, in some cases at least 1.2, in some cases at least 1.3, and in some cases even more (e.g., at least 1.4 or more). The ratio $H_t/(S_t/N_r)$ may have any other suitable value in other embodiments.

Accordingly, in this embodiment, the traction projections $58_1$-$58_T$, notably in view of their size and staggered arrangement, enhance traction of the track 21 on the ground.

In this embodiment, provision of the traction projections $58_1$-$58_T$ can result in certain benefits for the carcass 35.

For instance, in this embodiment, provision of the traction projections $58_1$-$58_T$ allows the carcass 35 to be thinner. For example, in some embodiments, the thickness $T_c$ of the carcass 35 may be no more than 0.20 inches, in some cases no more than 0.18 inches, in some cases no more than 0.16 inches, and in some cases even less (e.g., 0.15 inches or less).

Also, in this embodiment, provision of the traction projections $58_1$-$58_T$ allows one or more of the reinforcements $45_1$-$45_P$ embedded in the rubber 38 of the carcass 35 to be better positioned.

Figure 9:
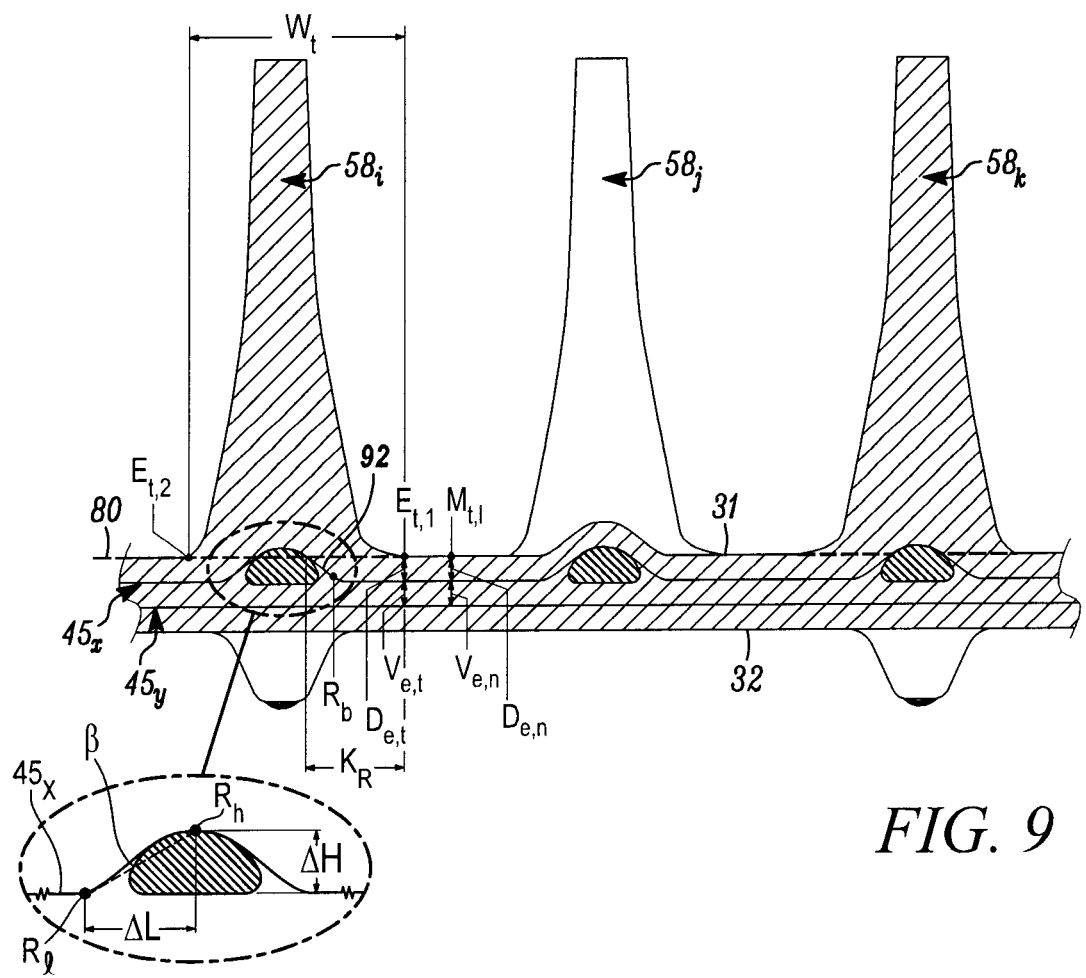
FIG. 9 shows an example of positions of reinforcements embedded in elastomeric material of the track.

For example, in some embodiments, with additional reference to FIG. 9, a reinforcement $45_x$ extending in the longitudinal direction of the track 21, such as the reinforcement $45_j$ which is the layer of reinforcing fabric 43, may be less deflected where a traction projection $58_i$ is located (e.g., less "pulled" by the rubber 41 of the traction projection $58_i$ during molding of the track 21). In FIG. 9, the carcass 35 is not to scale but rather enlarged in the thickness direction of the track 21 for ease of illustration and explanation.

For instance, in some embodiments, at least part of the reinforcement $45_x$ may be located below an outer surface level 80 of the carcass 35 underneath (i.e., directly beneath) the traction projection $58_i$. The outer surface level 80 of the carcass 35 is that level defined by the ground-engaging outer surface 31 of the carcass 35. More particularly, in this case, a segment 92 of the reinforcement $45_x$ is below the outer surface level 80 of the carcass 35 underneath the traction projection $58_i$. A point $R_b$ of the reinforcement $45_x$ that is located between and spaced apart from extremities $E_{t,1}$, $E_{t,2}$ of the traction projection $58_i$ in the longitudinal direction of the track 21 is thus located below the outer surface level 80 of the carcass 35. An extent $K_R$ of the segment 92 of the reinforcement $45_x$ in the longitudinal direction of the track 21 may have any suitable value. For example, in some embodiments, a ratio $K_R/W_t$ of the extent $K_R$ of the segment 92 of the reinforcement $45_x$ in the longitudinal direction of the track 21 over a width $W_t$ of the traction projection $58_i$ in the longitudinal direction of the track 21 may be at least 10%, in some cases at least 15%, in some cases at least 20%, in some cases at least 25%, in some cases at least 30%, in some cases at least 40%, in some cases at least 50%, and in some cases even more (e.g., up to 100%). The point $R_b$ of the reinforcement $45_x$ may thus be spaced apart from the extremity $E_{t,1}$ of the traction projection $58_i$ by at least 10%, in some cases at least 15%, in some cases at least 20%, in some cases at least 25%, in some cases at least 30%, in some cases at least 40%, in some cases at least 50%, and in some cases even more.

In this example of implementation, the reinforcement $45_x$ extends over the transversal stiffening rod $36_i$ located where the traction projection $58_i$ is located. As a result, in this case, part of the reinforcement $45_x$ may extend above the outer surface level 80 of the carcass 35 where the traction projection $58_i$ is located. In other cases, all of the reinforcement $45_x$ may remain at or below the outer surface level 80 of the carcass 35 where the traction projection $58_i$ is located (e.g., if the transversal stiffening rod $36_i$ is smaller or if there is no transversal stiffening rod where the traction projection $58_i$ is located).

In some embodiments, the reinforcement $45_x$ may deflect over a smaller longitudinal extent underneath the traction projection $58_i$. For example, a gradient $\beta$ of the reinforcement $45_x$ underneath the traction projection $58_i$ may be relatively high. The gradient $\beta$ of the reinforcement $45_x$ refers to a ratio $\Delta L/\Delta H$ of a distance $\Delta L$ between lowest and highest points $R_l$, $R_h$ of the reinforcement $45_x$ underneath the traction projection $58_i$ over a distance $\Delta H$ between the lowest and highest points $R_l$, $R_h$ of the reinforcement $45_x$ underneath the traction projection $58_i$. For instance, in some embodiments, the gradient $\beta$ of the reinforcement $45_x$ underneath the traction projection $58_i$ may be at least 0.6, in some cases at least 0.65, in some cases at least 0.70, in some cases at least 0.75, and in some cases greater.

In some embodiments, the reinforcement $45_x$ may be disposed such that a distance $D_{e,t}$ in the thickness direction of the track 21 from the reinforcement $45_x$ to the outer surface level 80 of the carcass 35 at the extremity $E_{t,1}$ of the traction projection $58_i$ substantially corresponds to a distance $D_{e,n}$ in the thickness direction of the track 21 from the reinforcement $45_x$ to the outer surface level 80 of the carcass 35 at a longitudinal midpoint $M_{t,l}$ between the traction projection $58_i$ and a traction projection $58_j$ that succeeds the traction projection $58_i$ in the longitudinal direction of the track 21. For instance, in some embodiments, a ratio $D_{e,t}/D_{e,n}$ of the distance $D_{e,t}$ from the reinforcement $45_x$ to the outer surface level 80 of the carcass 35 at the extremity $E_{t,1}$ of the traction projection $58_i$ over the distance $D_{e,n}$ from the reinforcement $45_x$ to the outer surface level 80 of the carcass 35 at the longitudinal midpoint $M_{t,l}$ between the traction projections $58_i$, $58_j$ may be between 0.9 and 1.1, in some cases between 0.95 and 1.05, in some cases between 0.98 and 1.02, and in some cases even closer to or equal to 1. The ratio $D_{e,t}/D_{e,n}$ may have any other suitable value in other embodiments.

In some embodiments, the reinforcement $45_x$ and another reinforcement $45_y$ extending in the longitudinal direction of the track 21, such as the reinforcement $45_i$ which is the layer of reinforcing cables $37_1$-$37_M$, may remain generally uniformly spaced apart from one another within the carcass 35. For instance, the reinforcements $45_x$, $45_y$ may be disposed such that a distance $V_{e,t}$ between them in the thickness direction of the track 21 at extremity $E_{t,1}$ of the traction projection $58_i$ substantially corresponds to a distance $V_{e,n}$ between them in the thickness direction of the track 21 at the longitudinal midpoint $M_{t,l}$ between the traction projection $58_i$ and the traction projection $58_j$ that succeeds the traction projection $58_i$ in the longitudinal direction of the track 21. For example, in some embodiments, a ratio $V_{e,t}/V_{e,n}$ of the distance $V_{e,t}$ between the reinforcements $45_x$, $45_y$ at the extremity $E_{t,1}$ of the traction projection $58_i$ over the distance $V_{e,n}$ between the reinforcements $45_x$, $45_y$ at the longitudinal midpoint $M_{t,i}$ between the traction projections $58_i$, $58_j$ may be between 0.9 and 1.1, in some cases between 0.95 and 1.05, in some cases between 0.98 and 1.02, and in some cases even closer to or equal to 1. The ratio $V_{e,t}/V_{e,n}$ may have any other suitable value in other embodiments.

Figure 10:
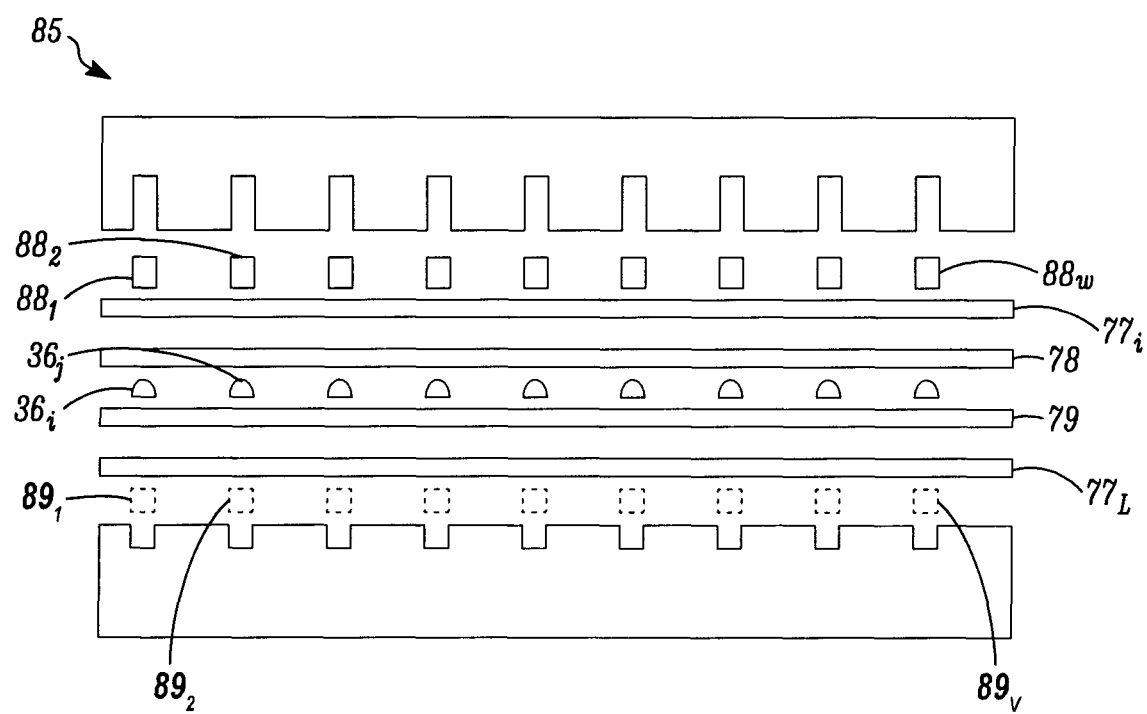
FIG. 10 shows an example of a process to manufacture the track.
Figure 11:
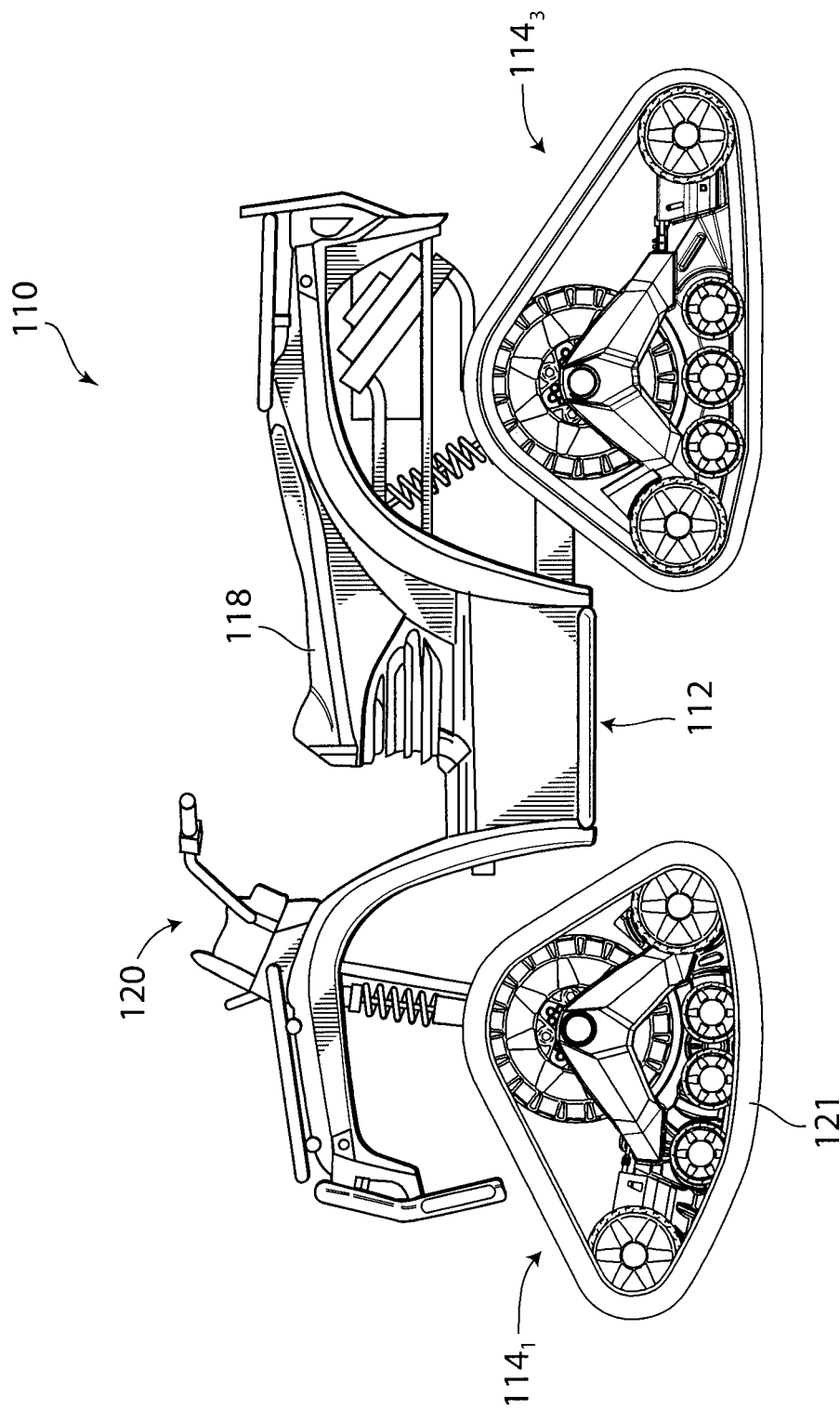
FIGS. 11 to 14 show an example of an all-terrain vehicle (ATV) comprising track systems in accordance with another embodiment of the invention, instead of being equipped with ground-engaging wheels.
Figure 12:
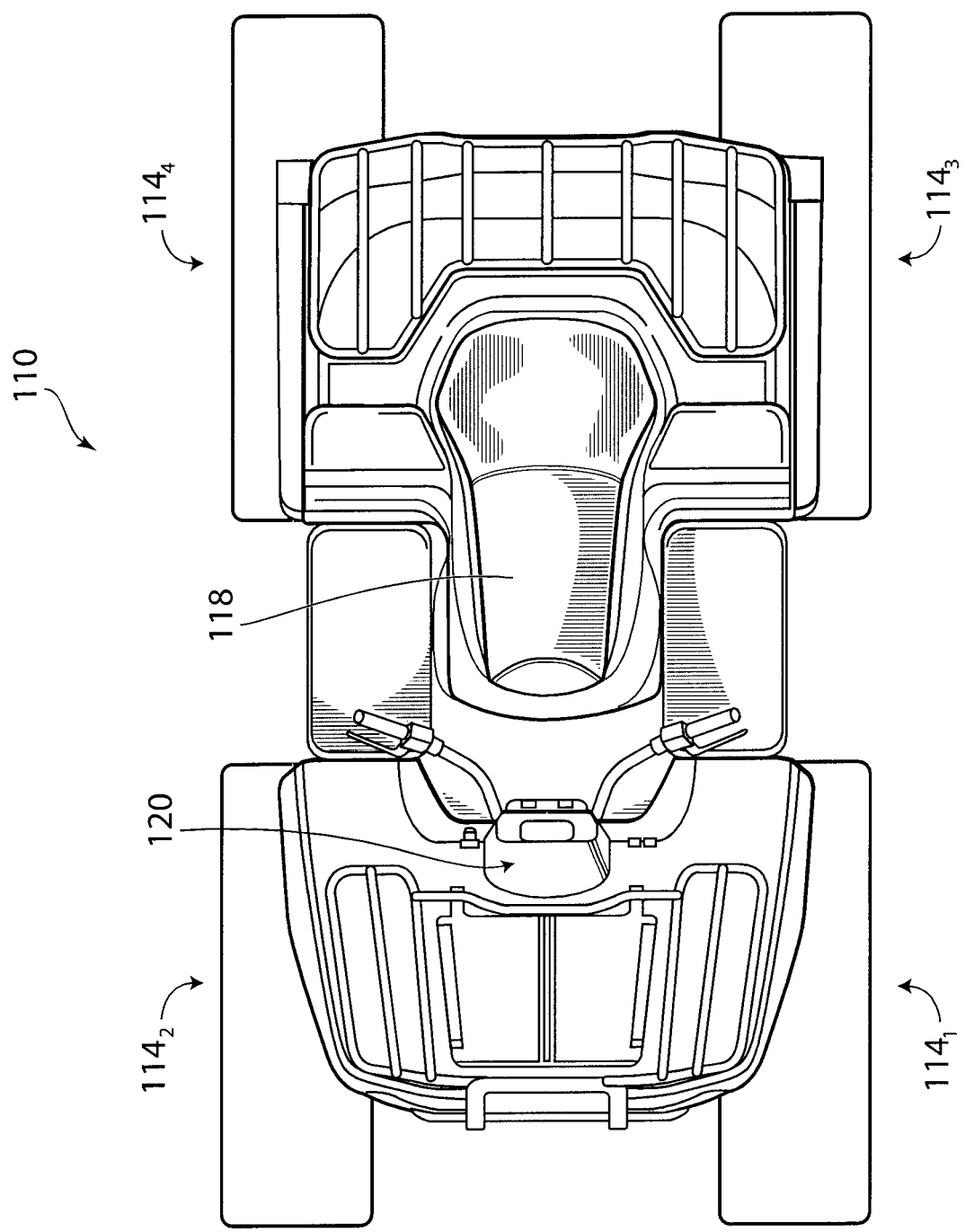
Figure 13:
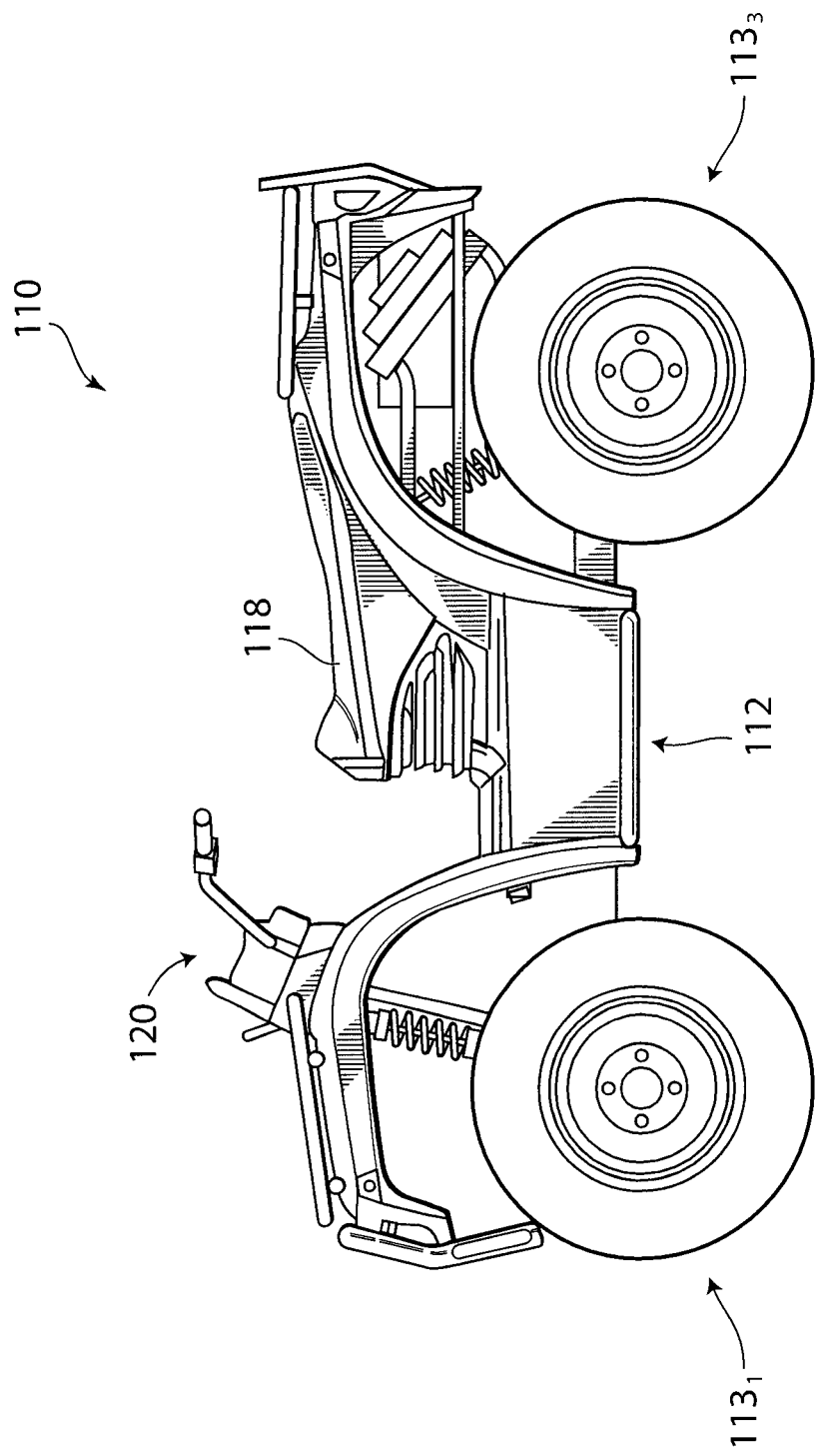
Figure 14:
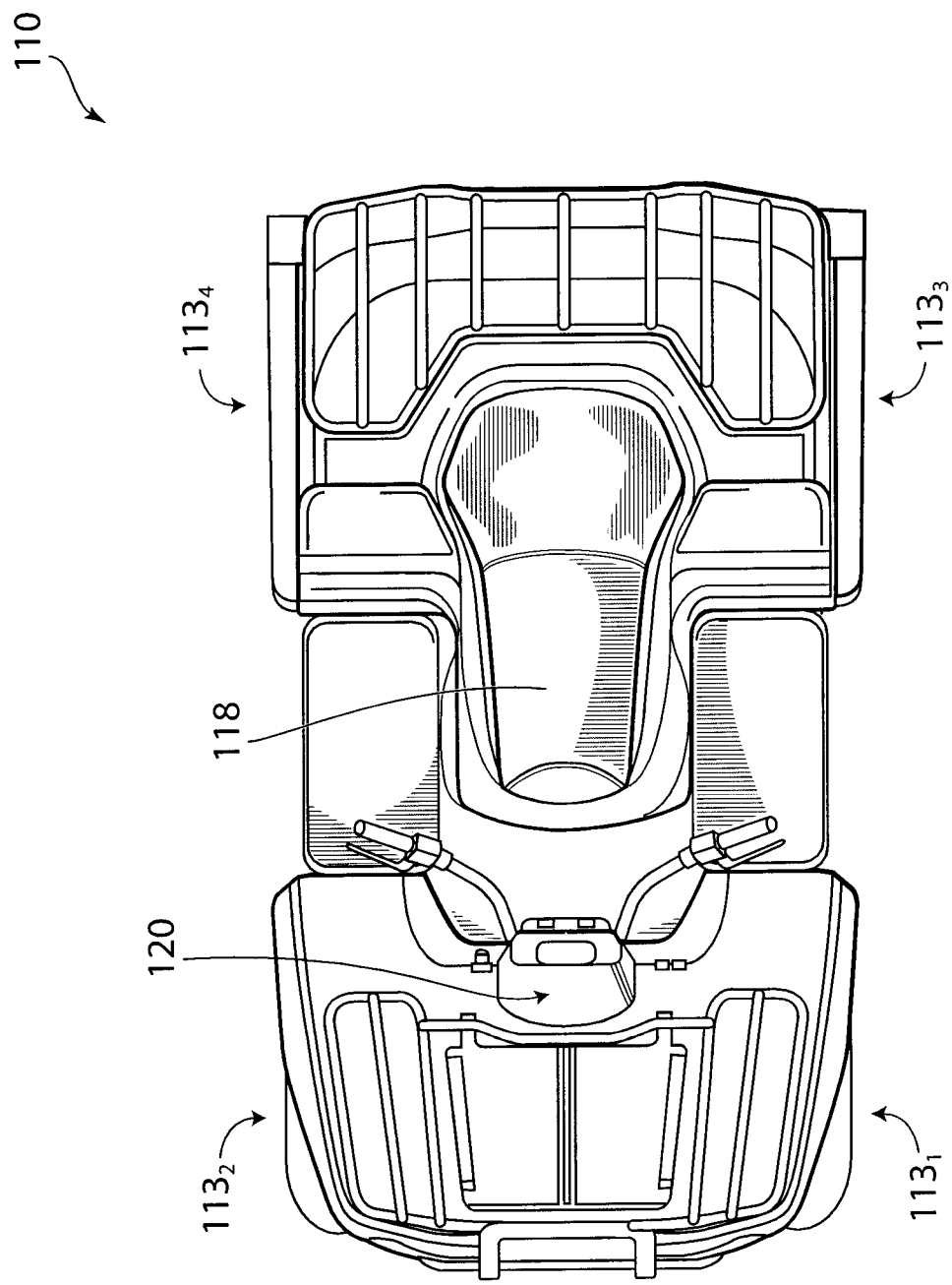

The track 21 may be manufactured in various ways. For example, in this embodiment, with additional reference to FIG. 10, an example of a process for manufacturing the track 21 will be discussed. In this example, the track 21 is manufactured by molding it in sections in a mold 85. More particularly, in this example, the track 21 is manufactured by compression molding.

In this embodiment, the rubber 38 and the reinforcements $45_1$-$45_P$, including the transversal stiffening rods $36_1$-$36_N$, the layer of reinforcing cables $37_1$-$37_M$, and the layer of reinforcing fabric 43, of the carcass 35 are provided in the mold 85. For instance, in this example, a plurality of layers (e.g., sheets) of rubber $77_1$-$77_L$, a ply of fabric 78, and a cable arrangement 79 may be layered onto one another into the mold 85 with the transversal stiffening rods $36_1$-$36_N$ placed at appropriate positions between respective ones of these layered elements. In some cases, the ply of fabric 78 or the cable arrangement 79 may have been previously embedded in rubber such that it is provided as a rubber-covered fabric or cable arrangement. The layered elements used to make the carcass 35 may have been previously produced using various processes (e.g., calendering). Collectively, the layers of rubber $77_1$-$77_L$ and, if present, the rubber of the ply of fabric 78 and/or the cable arrangement 79 will, upon curing, form part of the rubber 38 of the carcass 35.

Also, in this embodiment, distinct pieces of rubber $88_1$-$88_W$ are placed in the mold 85 to form at least part of the traction projections $58_1$-$58_T$. The distinct pieces of rubber $88_1$-$88_W$ are spaced apart from one another and positioned on the layered elements used to make the carcass 35 in order to provide at least part of the rubber 41 of the traction projections $58_1$-$58_T$. For instance, the distinct pieces of rubber $88_1$-$88_W$ may be placed at locations of respective ones of the traction projections $58_1$-$58_T$ (e.g., in cavities of the mold 85). This may allow the layers of rubber $77_1$-$77_L$ to form the carcass 35 to be fewer in number and/or one or more of these layers to be thinner.

Furthermore, in this embodiment, the rubber 42 of the drive/guide lugs $34_1$-$34_D$ is provided in the mold 85. For instance, in some embodiments, the rubber 42 of the drive/guide lugs $34_1$-$34_D$ may be provided by parts of an inner one of the layers of rubber $77_1$-$77_L$ used to make the carcass 35 which will migrate into cavities of the mold 85 to form the drive/guide lugs $34_1$-$34_D$ during molding. Alternatively, in some embodiments, distinct pieces of rubber $89_1$-$89_V$ may be placed in the mold 85 to form at least part of the drive/guide lugs $34_1$-$34_D$, similarly to what is discussed above in respect of the distinct pieces of rubber $88_1$-$88_W$ to form at least part of the traction projections $58_1$-$58_T$.

The mold 85 is then closed and heat and pressure are applied to consolidate the components of the track 21 inside the mold 85, including curing their rubber. The mold 85 may be heated to various temperatures and may be subjected to various levels of pressure, depending on material properties and desired performance characteristics of the track 21.

Once the molding operation is completed, the track 21 may be removed from the mold 85 and may be subject to one or more finishing operations (e.g., flash trimming, etc.)

The track 21 may be manufactured in any other suitable way in other embodiments.

While embodiments described above relate to a snowmobile, in other embodiments, any feature of any embodiment described above may be used in another type of off-road vehicle.

For example, in some embodiments, as shown in FIGS. 11 to 14, any feature of any embodiment described above may be used in an all-terrain vehicle (ATV) 110 comprising a set of track systems $114_1$-$114_4$ providing traction to the ATV on the ground. The ATV 10 comprises a prime mover 112 in a driving relationship with the track systems $114_1$-$114_4$ via the ATV's powertrain, a seat 118, and a user interface 120, which enable a user of the ATV 110 to ride the ATV 110 on the ground. In this case, the seat 118 is a straddle seat and the ATV 110 is usable by a single person such that the seat 118 accommodates only that person driving the ATV 110. In other cases, the seat 118 may be another type of seat, and/or the ATV 110 may be usable by two individuals, namely one person driving the ATV 110 and a passenger, such that the seat 118 may accommodate both of these individuals (e.g., behind one another or side-by-side) or the ATV 110 may comprise an additional seat for the passenger. For example, in other embodiments, the ATV 110 may be a side-by-side ATV, sometimes referred to as a "utility terrain vehicle" or "UTV". The user interface 120 comprises a steering device operated by the user to control motion of the ATV 110 on the ground. In this case, the steering device comprises handlebars. In other cases, the steering device may comprise a steering wheel or other type of steering element. Each of the front track systems $114_1$, $114_2$ is pivotable about a steering axis of the ATV 110 in response to input of the user at the handlebars in order to steer the ATV 110 on the ground.

In this embodiment, each track system $114_i$ is mounted in place of a ground-engaging wheel $113_i$ that may otherwise be mounted to the ATV 110 to propel the ATV 110 on the ground. That is, the ATV 110 may be propelled on the ground by four ground-engaging wheels $113_1$-$113_4$ with tires instead of the track systems $114_1$-$114_4$. Basically, in this embodiment, the track systems $114_1$-$114_4$ may be used to convert the ATV 110 from a wheeled vehicle into a tracked vehicle, thereby enhancing its traction and floatation on the ground.

Any feature described herein with respect to the track system 14 of the snowmobile 10, including its track 21, may be applied to a track system $114_i$ of the ATV 110, including its track 121.

The snowmobile 10 and the ATV 110 considered above are examples of tracked recreational vehicles. While they can be used for recreational purposes, such tracked recreational vehicles may also be used for utility purposes in some cases.

Any feature of any embodiment described herein may be used in combination with any feature of any other embodiment described herein.

Certain additional elements that may be needed for operation of certain embodiments have not been described or illustrated as they are assumed to be within the purview of those of ordinary skill in the art. Moreover, certain embodiments may be free of, may lack and/or may function without certain elements that are not specifically disclosed herein.

Although various embodiments and examples have been presented, this was for the purpose of describing, but not limiting, the invention. Various modifications and enhancements will become apparent to those of ordinary skill in the art and are within the scope of the invention, which is defined by the appended claims.

The invention claimed is:

1. A track for traction of an off-road vehicle, the track being mountable around a track-engaging assembly comprising a drive wheel for driving the track, the track being elastomeric to be flexible around the track-engaging assembly, the track comprising:
   a carcass comprising an inner surface for facing the track-engaging assembly and a ground-engaging outer surface for engaging the ground;
   a plurality of traction projections projecting from the ground-engaging outer surface of the carcass;
   a plurality of stiffening rods extending transversally to a longitudinal direction of the track and spaced apart in the longitudinal direction of the track; and
   a reinforcement embedded between the inner surface of the carcass and the ground-engaging outer surface of the carcass;
wherein: the stiffening rods are disposed between the reinforcement and the inner surface of the carcass; the reinforcement comprises segments underneath respective ones of the traction projections; at least a majority of each of the segments of the reinforcement is located below a level of the ground-engaging outer surface of the carcass; and at least part of the stiffening rods is located at the level of the ground-engaging outer surface of the carcass.

2. The track of claim 1, wherein the reinforcement is a reinforcing fabric.

3. The track of claim 1, wherein a ratio of (i) a height of a given one of the traction projections over (ii) a thickness of the carcass of the track from the inner surface to the ground-engaging outer surface is at least 15.

4. The track of claim 1, wherein the off-road vehicle is a snowmobile and the track is a snowmobile track.

5. The track of claim 1, wherein an entirety of each of the segments of the reinforcement is located below the level of the ground-engaging outer surface of the carcass.

6. The track of claim 1, comprising a plurality of layers of elastomeric material and a plurality of distinct pieces of elastomeric material spaced apart from one another in the longitudinal direction of the track, wherein: the layers of elastomeric material are molded to form at least part of the inner surface and the ground-engaging outer surface of the carcass; the distinct pieces of elastomeric material are molded to form at least part of respective ones of the traction projections; and the distinct pieces of elastomeric material are consolidated with a given one of the layers of elastomeric material forming at least part of the ground-engaging outer surface during molding.

7. The track of claim 6, wherein the distinct pieces of elastomeric material are molded to form at least a majority of each of the respective ones of the traction projections.

* * * * *